(12) United States Patent
Riley

(10) Patent No.: US 6,608,466 B2
(45) Date of Patent: Aug. 19, 2003

(54) CLEANING APPARATUS

(76) Inventor: Paul Riley, 715 Carmel Ave., Seal Beach, CA (US) 90740

( * ) Notice: Subject to any disclaimer, the term of this patent is extended or adjusted under 35 U.S.C. 154(b) by 0 days.

(21) Appl. No.: 09/970,470

(22) Filed: Oct. 3, 2001

(65) Prior Publication Data

US 2002/0039015 A1 Apr. 4, 2002

Related U.S. Application Data

(60) Provisional application No. 60/237,138, filed on Oct. 3, 2000.

(51) Int. Cl.$^7$ .................................................. H02J 7/00
(52) U.S. Cl. .......................................... 320/114; 15/344
(58) Field of Search ................................. 320/114, 107; 15/323, 344, 347, 350; 134/21

(56) References Cited

U.S. PATENT DOCUMENTS

| | | | |
|---|---|---|---|
| 4,225,814 A | | 9/1980 | Gantz et al. ................ 320/115 |
| 4,670,701 A | | 6/1987 | Sako et al. ................. 320/115 |
| 5,014,388 A | * | 5/1991 | Schiazza et al. .............. 15/339 |
| 5,869,947 A | | 2/1999 | Zahuranec et al. ......... 320/115 |
| 6,066,211 A | * | 5/2000 | Sandell ........................ 134/21 |
| 6,131,237 A | * | 10/2000 | Kasper et al. ................ 15/320 |
| 6,181,104 B1 | * | 1/2001 | Rhoads ....................... 320/114 |

* cited by examiner

Primary Examiner—Edward H. Tso
Assistant Examiner—Lawrence Luk
(74) Attorney, Agent, or Firm—Matthew Peirce

(57) ABSTRACT

A new and improved apparatus is disclosed which would allow a user to use a vacuum cleaner for up to about 15 to 20 minutes, or possibly even longer, without the need for an alternating current hookup. The present invention would weigh about 10 pounds and would be affixed to the side of a vacuum cleaner. The present invention would be capable of storing a charge necessary to run a vacuum cleaner for about 15 to 20 minutes, and would function as a temporary battery while providing 2,000 watts of continuous power output.

5 Claims, 1 Drawing Sheet

CLEANING APPARATUS

This application claims the benefit of Provisional application Ser. No. 60/237,138, filed Oct. 3, 2000.

I. BACKGROUND OF THE INVENTION

The present invention is that of a new and improved covering apparatus which would allow a user to use a vacuum cleaner for up to about 15 to 20 minutes, or possibly even longer, without the need for an alternating current hookup.

II. DESCRIPTION OF THE PRIOR ART

U.S. Pat. No. 5,869,947, issued to Zahuranec et al., discloses a rechargeable cordless vacuum cleaner system which comprises a hand held vacuum cleaner and a separable charger.

U.S. Pat. No. 5,014,388, issued to Schiazza et al., discloses improvements in vacuum cleaners, and is more particularly directed to the provision of a battery powered upright vacuum cleaner.

U.S. Pat. No. 4,670,701, issued to Sako et al., discloses a rechargeable cordless vacuum cleaner apparatus which includes a hand-held cordless vacuum cleaner containing rechargeable batteries, a motor, a fan driven by a motor and a dust-collection filter, and a charging unit containing a power transformer and rectifier diode.

U.S. Pat. No. 4,225,814, issued to Gantz et al., discloses a storing and recharging base for a cordless electric vacuum cleaner of the type which includes an elongated housing having an electric motor and fan and rechargeable batteries therein.

III. SUMMARY OF THE INVENTION

The present invention is that of a new and improved apparatus which would allow a user to use a vacuum cleaner for up to about 15 to 20 minutes, or possibly even longer, without the need for an alternating current hookup. The present invention would weigh about 10 pounds and would be affixed to the side of a vacuum cleaner. The present invention would be capable of storing a charge necessary to run a vacuum cleaner for about 15 to 20 minutes, and would function as a temporary battery while providing 2,000 watts of continuous power output.

There has thus been outlined, rather broadly, the more important features of an apparatus for providing power to a vacuum cleaner in order that the detailed description thereof that follows may be better understood and in order that the present contribution to the art may be better appreciated. There are, of course, additional features of the apparatus for providing power to a vacuum cleaner that will be described hereinafter and which will form the subject matter of the claims appended hereto.

In this respect, before explaining at least one embodiment of the apparatus for providing power to a vacuum cleaner in detail, it is to be understood that the apparatus for providing power to a vacuum cleaner is not limited in its application to the details of construction and to the arrangements of the components set forth in the following description or illustrated in the drawings. The apparatus for providing power to a vacuum cleaner is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present apparatus for providing power to a vacuum cleaner. It is important, therefore, that the claims be regard as including such equivalent constructions insofar as they do not depart from the spirit and scope of the present invention.

It is therefore an object of the present invention to provide an apparatus for providing power to a vacuum cleaner which has all of the advantages of the prior art and none of the disadvantages.

It is another object of the present invention to provide an apparatus for providing power to a vacuum cleaner which may be easily and efficiently manufactured and marketed.

It is another object of the present invention to provide an apparatus for providing power to a vacuum cleaner which is of durable and reliable construction.

It is yet another object of the present invention to provide an apparatus for providing power to a vacuum cleaner which is economically affordable and available to the buying public.

It is yet another object of the present invention to provide an apparatus for providing power to a vacuum cleaner which provides additional benefits not present in the prior art.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
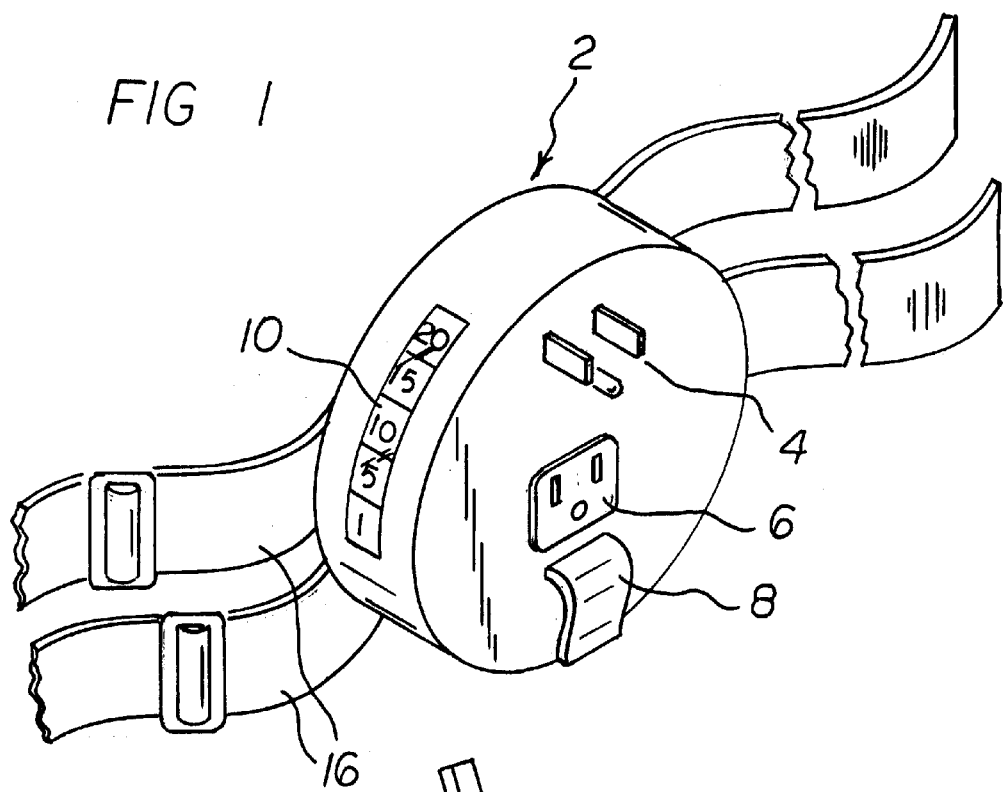
FIG. 1 shows a perspective view of the present invention.

FIG. 1 shows a perspective view of the present invention. The present invention is that of a new and improved covering apparatus 2 which would allow a user to use a vacuum cleaner for up to about 15 to 20 minutes, or possibly even longer, without the need for an alternating current hookup. The present invention would weigh about 10 pounds and would be affixed to the side of a vacuum cleaner.

Apparatus 2 would preferably be made in a circular shape, as seen in FIG. 1, and would have two faces, a front face and a rear face. In addition, apparatus 2 would have a continuous side edge. On the front face of apparatus 2 would be located charging plug 4, input plug socket 6, and clip 8. On the continuous side edge of apparatus 2 would be located gauge 10.

A user would plug apparatus 2 into a household wall socket with charging plug 4. This would allow apparatus 2 to properly charge up. Gauge 10 would have various number increments located on its face, with the number increments corresponding to how much power would presently be stored in apparatus 2. Once gauge 10 would be at its maximum, a user could remove apparatus 2 and either use it immediately or store it for later use.

A user could use clip 8 to latch onto a surface, edge, or object attached to a vacuum cleaner 12. Once this would be done, a user would take the plug 14 of a vacuum cleaner 12 and plug it into input plug socket 6. If apparatus 2 would be properly charged, a user would be able to vacuum for approximately 10–15 minutes without plugging vacuum cleaner 12 into a traditional wall socket. The apparatus 2 would provide power to the vacuum cleaner 12 at the rate of 2,000 watts.

The rear face of apparatus 2 would have a pair of straps 16 attached to the rear face. In lieu of using clip 8 to attach apparatus 2 to a vacuum cleaner, a user could instead use the pair of straps 16. This may be the better approach if it is hard to use clip 8 for any one of a variety of reasons.

Figure 2:
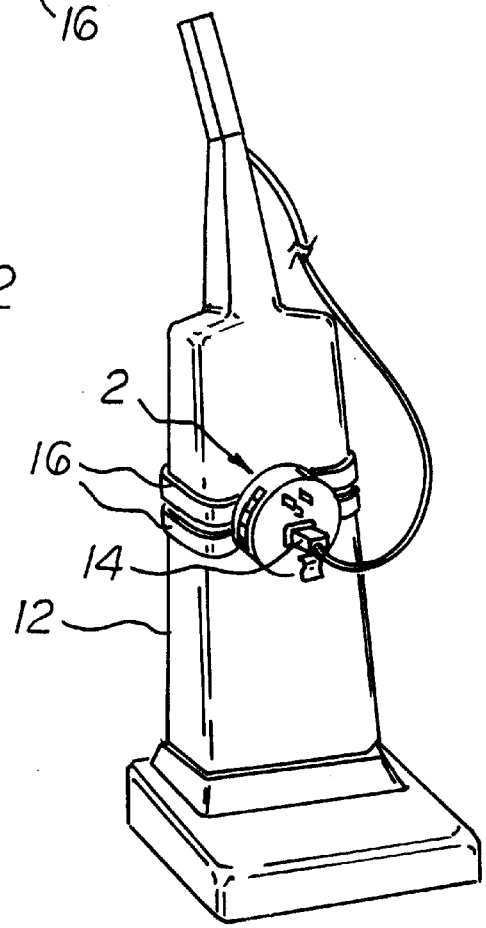
FIG. 2 shows the present invention attached to the side of a vacuum cleaner, in use.

FIG. 2 shows the present invention attached to the side of a vacuum cleaner 12, in use.

What I claim as my invention is:

1. A cleaning apparatus comprising:
   (a) a vacuum cleaner, the vacuum cleaner preferably be an upright model, the vacuum cleaner including an electrical cord,
   (b) a power storing apparatus removably attached to the vacuum cleaner, the power storing apparatus preferably being disc shaped, the power storing apparatus having a front face, a rear face, and a continuous side edge,
   (c) a charging plug attached to the front face of the power storing apparatus, the charging plug capable of being plugged into a wall outlet within a structure,
   (d) a socket attached to the front face of the power storing apparatus,
   (e) a clip attached to the front face of the power storing apparatus,
   (f) a gauge attached to the continuous side edge of the power storing apparatus, and
   (g) a pair of straps attached to the rear face of the power storing apparatus,
   (h) wherein the electrical cord could be plugged into the socket for operation of the vacuum cleaner, and
   (i) further wherein the power storing apparatus would have enough power to run the vacuum cleaner for ten to fifteen minutes before needing to be recharged.

2. A cleaning apparatus according to claim 1 wherein the power storing apparatus would be removably attached to the vacuum cleaner by the pair of straps by wrapping the pair of straps around the vacuum cleaner.

3. A cleaning apparatus according to claim 1 wherein the power storing apparatus would be removably attached to the vacuum cleaner by the clip.

4. A cleaning apparatus according to claim 1 wherein the gauge would further comprise a plurality of numbers increments, the plurality of number increments designed to measure the current amount of power being stored within the power storing apparatus.

5. A cleaning apparatus according to claim 1 wherein the power storing apparatus would provide power the vacuum cleaner at the rate of 2,000 watts.

* * * * *